(12) United States Patent
Hua

(10) Patent No.: US 11,709,278 B2
(45) Date of Patent: Jul. 25, 2023

(54) METHOD AND SYSTEM FOR SIGNAL DETECTION INCLUDING POSITIONING SIGNALS

(71) Applicant: STAR ALLY INTERNATIONAL LIMITED, Tortola (VG)

(72) Inventor: Wensheng Hua, Fremont, CA (US)

(73) Assignee: STAR ALLY INTERNATIONAL LIMITED, Tortola (VG)

( * ) Notice: Subject to any disclaimer, the term of this patent is extended or adjusted under 35 U.S.C. 154(b) by 0 days.

(21) Appl. No.: 17/408,909

(22) Filed: Aug. 23, 2021

(65) Prior Publication Data

US 2021/0382180 A1  Dec. 9, 2021

Related U.S. Application Data

(62) Division of application No. 15/991,217, filed on May 29, 2018, now Pat. No. 11,137,502.

(51) Int. Cl.
*G01S 19/34* (2010.01)
*G01S 19/25* (2010.01)
*G01S 19/36* (2010.01)

(52) U.S. Cl.
CPC ............ *G01S 19/34* (2013.01); *G01S 19/254* (2013.01); *G01S 19/256* (2013.01); *G01S 19/258* (2013.01); *G01S 19/36* (2013.01)

(58) Field of Classification Search
CPC .... G01S 19/254; G01S 19/256; G01S 19/258; G01S 19/36; G01S 19/34; G01S 19/05–06
See application file for complete search history.

(56) References Cited

U.S. PATENT DOCUMENTS 5,420,592 A   5/1995  Johnson
5,488,631 A   1/1996  Gold et al.
(Continued)

FOREIGN PATENT DOCUMENTS

EP   1197761 A2   4/2002
EP   3273271 A1   1/2018

OTHER PUBLICATIONS

"PCT Invitation to Pay Additional Fees, PCT/US2019/033388", dated Jul. 5, 2019.

(Continued)

*Primary Examiner* — Cassi J Galt
(74) *Attorney, Agent, or Firm* — Edward C. Kwok; VLP Law Group LLP

(57) ABSTRACT

An assisted satellite positioning system based on detecting signals from a number of satellites includes: (a) a mobile receiver; and (b) a base station communicating with the receiver over a low-power wireless communication network, the base station providing ephemeris data of a selected number of the satellites, but not all, using a compressed data format. The ephemeris data may include data concerning doppler frequency variations or elevation variations of the selected satellites over a predetermined time interval. The doppler frequency variations and the elevation variations may be represented in the compressed format by coefficients of a polynomial function of time. The polynomial function may be weighted to have lesser relative errors in larger doppler frequencies than lesser doppler frequencies, or to have lesser relative errors in lesser elevations than larger elevations. In one implementation, the low-power wireless communication network—such as a LoRa network—that has a range of at least 10 miles.

6 Claims, 6 Drawing Sheets

(56) References Cited

U.S. PATENT DOCUMENTS

| | | | |
|---|---|---|---|
| 5,825,327 A | 10/1998 | Krasner | |
| 6,121,923 A | 9/2000 | King | |
| 6,211,819 B1* | 4/2001 | King | G01S 19/27 342/357.42 |
| 6,437,734 B1* | 8/2002 | McBurney | G01S 19/071 342/357.62 |
| 7,619,560 B2 | 11/2009 | Penna et al. | |
| 8,717,236 B2 | 5/2014 | Street et al. | |
| 9,439,040 B2 | 9/2016 | Hua | |
| 2001/0001616 A1 | 5/2001 | Rakib et al. | |
| 2002/0071509 A1 | 6/2002 | Richards et al. | |
| 2003/0231704 A1 | 12/2003 | Tanaka et al. | |
| 2006/0022870 A1 | 2/2006 | Zimmerman et al. | |
| 2007/0121707 A1 | 5/2007 | Thor et al. | |
| 2007/0258511 A1 | 11/2007 | Knight et al. | |
| 2008/0143594 A1* | 6/2008 | Wang | G01S 19/246 342/357.64 |
| 2010/0073229 A1 | 3/2010 | Pattabiraman et al. | |
| 2010/0231448 A1* | 9/2010 | Harper | G01S 19/06 342/357.43 |
| 2017/0289952 A1* | 10/2017 | Muquet | H04J 11/0093 |

OTHER PUBLICATIONS

"PCT Search Report and Written Opinion, PCT/US2019/033388", dated Sep. 17, 2019.

* cited by examiner

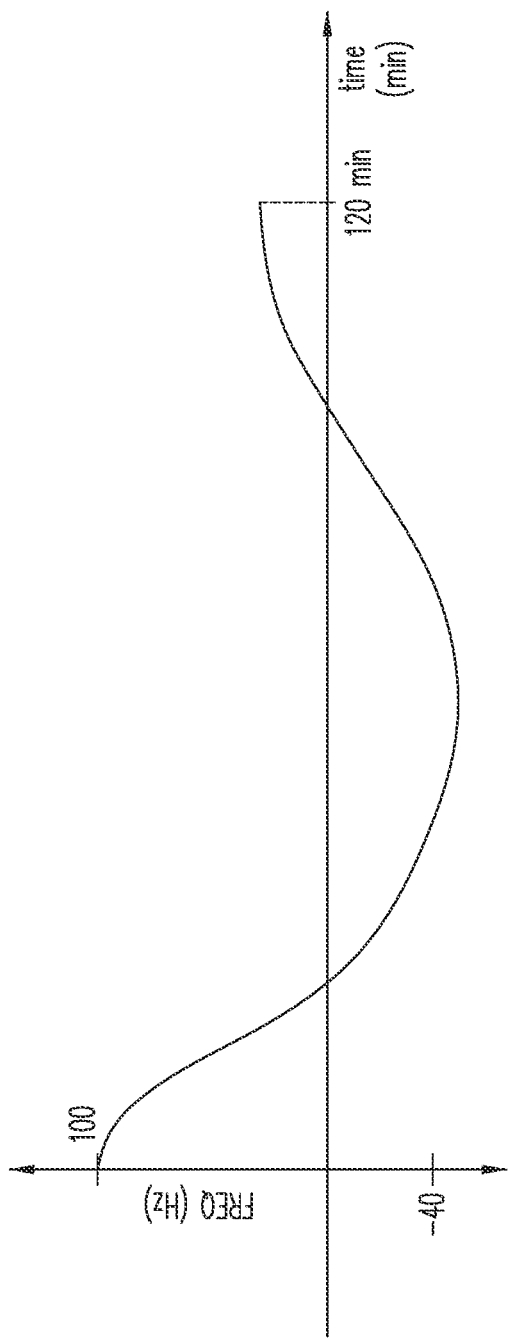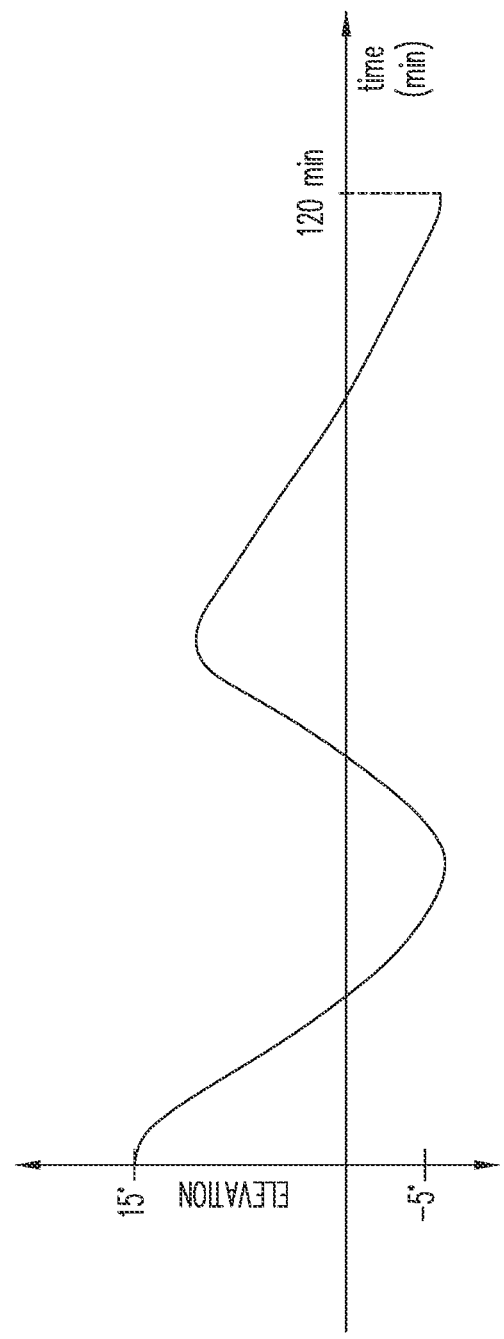

METHOD AND SYSTEM FOR SIGNAL DETECTION INCLUDING POSITIONING SIGNALS

CROSS REFERENCE TO RELATED APPLICATIONS

The present application is a divisional application of U.S. patent application ("Parent Application"), Ser. No. 15/991,217, entitled "Method and System for Signal Detection Including Positioning Signals," filed on May 29, 2018. The disclosure of the Parent Application is hereby incorporated by reference in its entirety.

BACKGROUND OF THE INVENTION

1. Field of the Invention

The present invention relates to signal detection. Specifically, the present invention relates to signal detection for positioning applications.

2. Discussion of the Related Art

In many positioning applications, e.g., those related to the Global Positioning System (GPS), a signal receiver detects signals from sources of known locations. An estimate of the signal's time of travel between the source and the receiver ("delay") provides an estimate of the distance between the source and the receiver. The distances are then used to triangulate the recipient's location. In GPS, for example, spread spectrum signals from multiple GPS satellites of known positions and motions are detected and triangulated to get the receiver's position. In that example, each satellite's signal embeds a 1023-bit pseudorandom code that is repeated every millisecond. (The duration of each bit in the signal is known as a "chip"). To detect the signal, a correlation is computed ("integrated") between the received signal and a replicated signal over a selected time period. Because of the satellite's motion related to the receiver, the integration must take account a shift in frequency ("doppler") in the received signal. Detection is achieved when the integration results in a peak value indicating that the replicated signal aligns in both time (i.e., delay) and frequency with the received signal. If the replicated signal does not align with the received signal, the integration results in a zero value.

Typically, in GPS, the delay and doppler values are arrived after searching through a search space of 1 millisecond in time and 8000 Hz in doppler. After the signal is first detected ("coarse acquisition"), the signal may be tracked to provide regular updates. In tracking, the receiver does not search the entire search space of the coarse acquisition, provided that the tracking interval is relatively short, such that the satellite's position and motion have not significantly changed over that tracking interval. Typically, tracking may be achieved by searching over a much smaller search space surrounding the delay and doppler values obtained in the last coarse acquisition (e.g., within ¼ chip (0.25 µs) in delay and 10-100 Hz in doppler). Of course, the greater the precision achieved in the detecting of the delay and doppler values, the greater the accuracy would be achieved in the positioning application.

Detection of a satellite signal allows one to determine the satellite's distance and the corresponding motion relative to the receiver (e.g., the acceleration towards or away from the receiver). To triangulate the receiver's location, one needs also the absolute positions and motions of four or more satellites. This information may be determined from the "ephemeris" information which is also transmitted in the satellite signal. Ephemeris information is also useful for coarse acquisition at a "cold start." (That is, coarse acquisition without any reliable a priori information regarding receiver position.) A full set of ephemeris information covering all satellites in GPS over a period of months is about a few 10 Kbytes long. To obtain ephemeris information from the satellite signal, one needs to track a satellite signal for 30 seconds or more. Alternatively, the ephemeris information may be obtained over a high-bandwidth cellular or a wide-area network from an on-line source, such as an assisted GPS (AGPS) service.

Both satellite signal tracking and data communication may be undesirably power-intensive for a mobile device operating from battery power. Thus, it is long desired to have energy-efficient hardware and methods for positioning in a mobile device.

SUMMARY

According to one embodiment of the present invention, a signal processing device for detecting a spread spectrum signal modulated with a pseudorandom code of a predetermined number of chips, includes: (a) a temperature-compensated crystal oscillator providing a timing signal accurate to a predetermined fraction of one of the chips; (b) a clock generator receiving the timing signal to generate a digital clock signal of a predetermined frequency; (c) an analog signal processing circuit receiving the timing signal, the digital clock signal and the spread spectrum signal and providing digital baseband samples of the spread spectrum signal at each period of the digital clock signal; (d) a counter circuit receiving the digital clock signal to provide a timing pulse of a predetermined duration; (e) a data buffer; (f) an input interface circuit for the data buffer, receiving the digital baseband samples, the digital clock signal and the timing pulse, and storing into the digital baseband samples into the data buffer over the predetermined duration; and (g) a processor which retrieves the stored baseband samples from the data buffer to perform signal detection. The input interface circuit may be implemented by parallel-connected serial peripheral interface (SPI) circuits. The predetermined frequency of the digital clock signal may be, for example, 16 MHz and be accurate to ¹⁄₁₆ µs. The digital baseband samples may be samples of in-phase and quadrature channels of the baseband signal derived from the received spread spectrum signal.

According to one embodiment of the present invention, the analog processing circuit need not be powered outside of the predetermined duration of the timing pulse. Similarly, the processor may enter a sleep state upon completion of the signal detection. Further, the processor, the data buffer and the input interface circuit are elements of an embedded microcontroller integrated circuit.

According to one embodiment of the present invention, the signal processing device may be solar-powered. The signal processing device may be provided a housing in which the temperature-compensated crystal oscillator, the clock generator, the analog signal processing circuit, the counter, the input interface circuit, the data buffer and the processor are mounted. In addition, the housing may include a battery, a power-regulation circuit for the battery and a solar panel converting solar energy into energy in the battery under control of the power-regulation circuit. In that implementation, the solar panel may be mounted on an outside surface of the housing.

According to one embodiment of the present invention, a method for detecting a signal, includes (a) receiving the signal; (b) computing, for each of a plurality of delay values, a correlation value between the received signal and a replica of the signal delayed by the delay value; (c) from the correlation values, selecting a first group of correlation values having non-zero values and a second group of correlation values, wherein the correlation values in the first group are increasing with increasing delay values, and wherein the correlation values in the second group are decreasing with increasing delay values; and (d) estimating a delay value based on extrapolation from each of the first correlation values. One implementation of estimating the delay value is based on fitting the correlation values in the first and second group to one or more polynomials of the delay. The delay value may be estimated, for example, based on an intersection of a straight line derived from the first group of correlation values and a straight line derived from the second group of correlation values.

According to one embodiment of the present invention, an assisted satellite positioning system based on detecting signals from a number of satellites includes: (a) a mobile receiver; and (b) a base station communicating with the receiver over a low-power wireless communication network, the base station providing ephemeris data of a selected number of the satellites, but not all, using a compressed data format. The ephemeris data may include data concerning doppler frequency variations or elevation variations of the selected satellites over a predetermined time interval. The doppler frequency variations and the elevation variations may be represented in the compressed format by coefficients of a polynomial function of time. The polynomial function may be weighted to have lesser relative errors in larger doppler frequencies than lesser doppler frequencies, or to have lesser relative errors in lesser elevations than larger elevations. In one implementation, the low-power wireless communication network—such as a LoRa network—that has a range of at least 10 miles.

The present invention is better understood upon consideration of the detailed description below, in conjunction with the accompanying drawings.

BRIEF DESCRIPTION OF THE DRAWINGS

FIG. 5a is an exemplary estimated variation in doppler values over a next period of 120 minutes for a given satellite visible or near-visible from station 302.

FIG. 5b is an exemplary estimated variation in elevation over a next period of 120 minutes for a given satellite visible or near-visible from station 302.

To facilitate cross-referencing among the figures, like elements are provided like reference numerals.

DETAILED DESCRIPTION OF THE PREFERRED EMBODIMENTS

The present inventor has developed a hardware solution which may be used, for example, in conjunction with an energy-efficient signal detection algorithm to allow a tracking interval in a satellite positioning application to exceed one second. One example of an energy-efficient signal detection algorithm is disclosed in the present inventor's U.S., patent application, Ser. No. 14/826,128, entitled "System and Method of Time of Flight Detection," filed Aug. 13, 2015, now U.S. Pat. No. 9,439,040 (the "'040 patent"). Because of the long tracking interval, the receiver requires much less power than receivers of the prior art.

Figure 1:
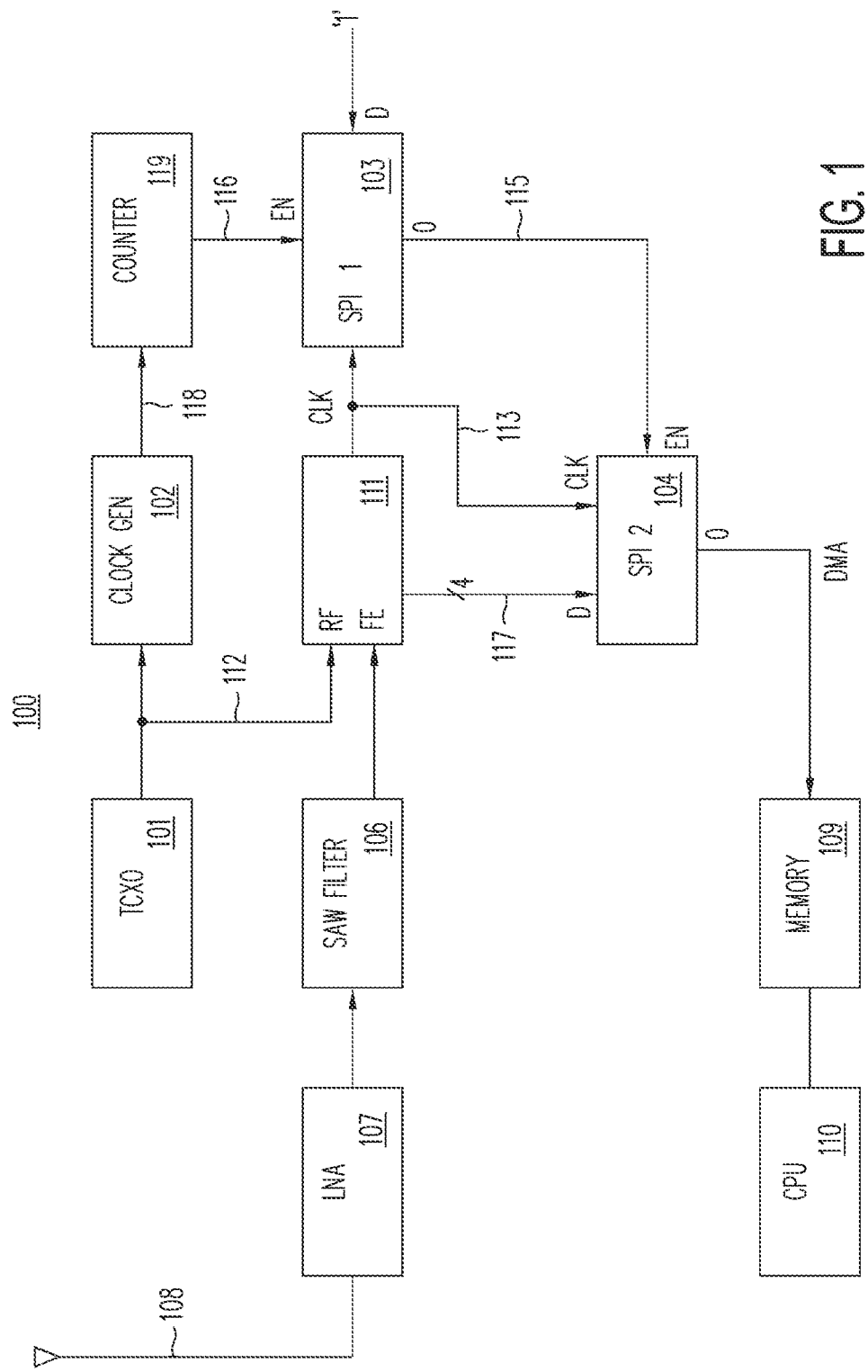
FIG. 1 shows signal detection system 100, in accordance with one embodiment of the present invention.

FIG. 1 shows signal detection system 100, in accordance with one embodiment of the present invention. As shown in FIG. 1, signal detection system 100 includes antenna 108 for receiving a satellite signal, low-noise amplifier 107 for amplification of the received satellite signal, surface acoustic wave (SAW) filter 106 for band-limiting the received satellite signal and radio-frequency (RF) front-end processing unit 111 for demodulating and further analog processing of the received satellite signal. RF front-end processing unit 111 also receives oscillator signal 112 from temperature-compensated crystal oscillator ("TCXO") 101. Timing signal 112 also allows generating clock signal 118 in clock generation circuit 102. Clock generation circuit 102 is optional in some embodiments where counter can receive the TCXO signal directly. According to one embodiment of the present invention, for a GPS application, clock signal 118 may be made accurate to 1/16 of a microsecond (i.e., at 16 MHz, accurate to 1/16 μs). An advantage of using oscillator signal 112 from TXCO 101 for analog signal processing and clock signal 118 for timing is that these signals are accurate in time independent of any change in temperature in the environment. RF front-end processing unit 111 includes an analog-to-digital converter which, in accordance with conventional signal processing protocols, may provide 4-bit data signal 117 per clock period of clock signal 113. Clock signals 113 and 118, which are preferably based on the same clock source (e.g., TCXO 101), may have difference frequencies. In one embodiment, clock signal 113 may be at about 32 MHz and 118 may be at 16 MHz. The relative phase between clock signals 113 and 118 may be arbitrary, since the delay caused by clock generation circuit 102 and TXCO 101 may be different. In one embodiment, 4-bit data signal 117 contains two channels providing digital in-phase (I) and quadrature (Q) baseband samples of the received satellite signal.

4-bit data signal 117 is received into a buffer in memory circuit 109, which is subsequently retrieved by central processing unit (CPU) 110 for processing. CPU 110 may perform the signal processing using, for example, the energy-efficient algorithm disclosed in the '040 patent. In one embodiment, CPU 110 may be an application-specific integration circuit (ASIC). In one embodiment, when a pre-determined amount of data from 4-bit data signal 117 is received (e.g., when the buffer in memory circuit 109 is filled, or after a predetermined interval, such as a few milliseconds), an interrupt is raised to indicate to CPU 110 that data is ready for processing. For energy-efficiency, data processing in RF front-end processing unit 111 may be switched off after the buffer in memory circuit 109 is filled. CPU 110 may also enter a sleep mode after processing the data in the buffer of memory circuit 109. Accurate timing in sampling the received satellite signal allows an extended tracking interval (e.g., 1 second). This accurate timing is provided by TCXO 101.

In signal detection 100, counter 119 is provided to generate timing signal 116 based on clock signal 118. As a result, timing signal 116 may be used to mark the beginning of each tracking interval accurate to clock signal 118 (e.g., $\frac{1}{16}$ μs). A 1-bit data buffer, which may be implemented by a serial peripheral interface (SPI) circuit 103, provides enable signal 115 for an input interface to receive 4-bit data signal 117 into the buffer circuit of memory circuit 109. Enable signal 115 is the output value of SPI circuit 103, which is supplied by a logic value '1' stored in the 1-bit data buffer. When the output data of SPI circuit 103 is enabled by timing signal 116, enable signal 119 transitions from logic value '0' to logic value '1' at the next falling edge of clock signal 113. This input interface may be implemented also by four parallel SPI circuits, indicated by reference numeral 104. In this manner, SPI circuit 103 aligns an edge of enable signal 115 with clock signal 113 (i.e., SPI circuit 104 samples 4-bit data signal at the falling edge of clock signal 113). Aligning the edge of enable signal 115 with clock signal 113 also helps to keep the samples of the 4-bit data signal synchronized with each other—i.e., avoid relative bit shifts among them. This is particularly important when SPI circuit 104 is implemented using four separated 1-bit SPI circuits in parallel.

In one embodiment, an embedded controller integrated circuit LPC54114, available from NXP semiconductor may be used to implement SPI circuits 103 and 104, memory circuit 109, counter 119 and CPU 110. The LPC54114 embedded controller includes an ARM microprocessor, an on-board memory circuit, and 8 on-board SPI interface circuits that can be used to implement CPU 110, memory circuit 109 and SPI circuit 103, counter 119 and SPI circuit 104. In one preferred embodiment, counter 119 is implemented so that generating timing signal 116 is not controlled by a CPU interrupt, so that the timing can be accurately controlled.

Figure 2:
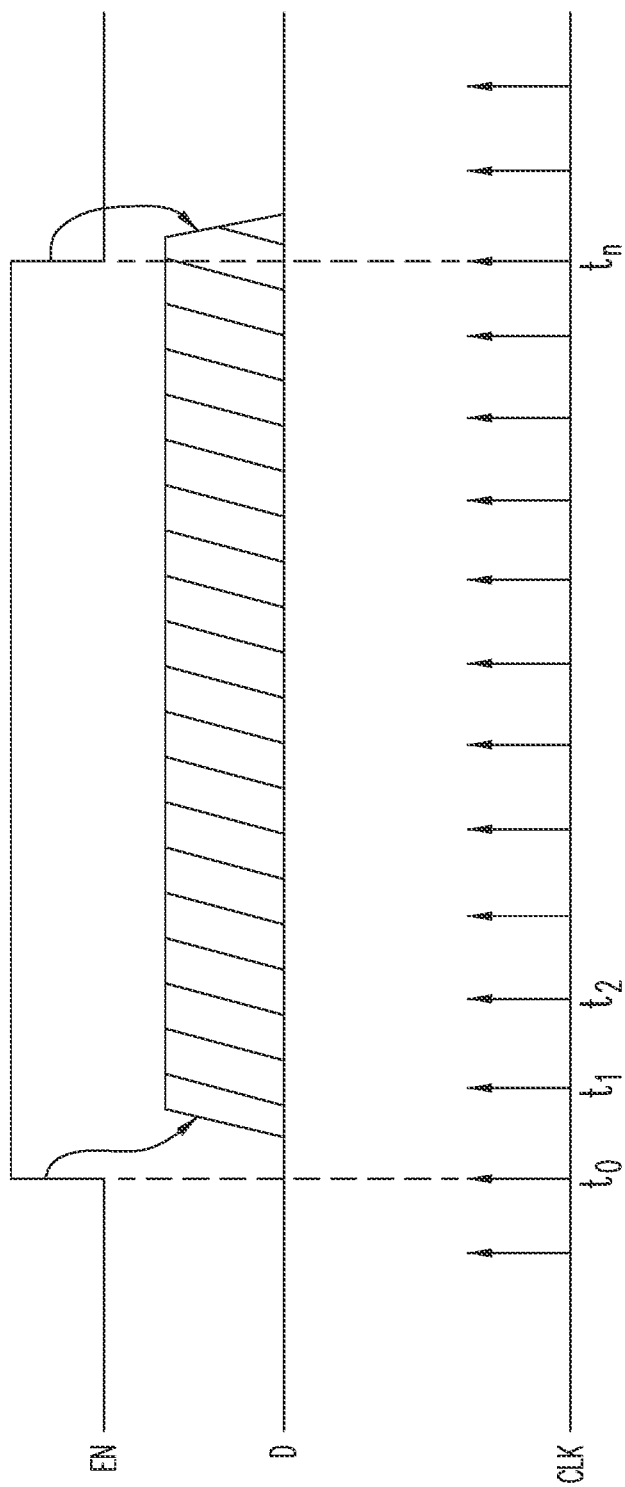
FIG. 2 shows timing of 4-bit data signal 117 of FIG. 1 at the output terminal of SPI circuit 104.

FIG. 2 shows the timing of 4-bit data signal 117 at the output terminal of SPI circuit 104. FIG. 2 shows (i) enable signal EN (i.e., enable signal 115 of FIG. 1) at SPI circuit 104, (ii) data signal D (i.e., 4-bit data signal 117 of FIG. 1), and (iii) clock signal CLK (i.e., clock signal 113). As shown in FIG. 2, at time $t_0$, enable signal EN is asserted, which enables SPI circuit 104 to begin to fill the buffer in memory circuit 109 using, for example, a direct memory access (DMA) mechanism. Following assertion of enable signal EN, at time $t_1$ and every clock period of clock signal CLK thereafter, data signal D outputs 4-bit of I or Q samples from SPI circuit 104 to the data buffer in memory circuit 109. The data is provided for a predetermined time period (e.g., 1 millisecond for 1023 chips). For example, at time $t_{1023}$, enable signal EN is deasserted and I and Q data samples output from data signal D also ceases.

Figure 3:
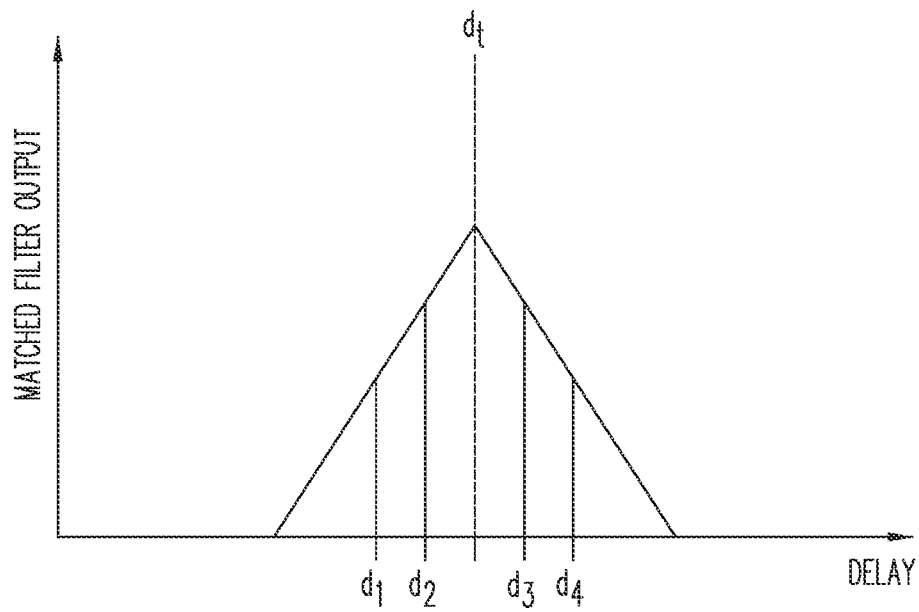
FIG. 3 shows matched filter output values at delays $d_1$, $d_2$, $d_3$, and $d_4$ during the detection of one satellite signal.

CPU 110 may then initiate a search algorithm on the data in the data buffer, such as that taught in the '040 patent mentioned above, to determine the delay time and doppler frequency in the satellite signal received. Typically, a portion of the search algorithm (known as a "matched filter") computes a correlation between a replicated signal and the satellite signal for a selected set of delay and doppler value pairs in the search space. FIG. 3 shows matched filter output values (correlation values) at delays $d_1$, $d_2$, $d_3$, and $d_4$ during the detection of one satellite signal. In one embodiment, 32 delay values may be used. When the replicated signal is perfectly aligned in both delay and doppler values with the satellite signal received, the output value of the matched filter is expected to be at its maximum. For some delay-doppler value pair near the delay-doppler value pair providing the maximum, the matched filter output is non-zero, but not maximum. In other words, assuming the doppler values are aligned, matched filter output values at delays $d_1$, $d_2$, $d_3$, and $d_4$ are close to but not the delay value that provides the maximum. The delay value $d_t$ that provides the maximum is expected to be between delays $d_2$ and $d_3$. According to one embodiment of the present invention, delay value $d_t$ may be estimated from estimating the rates of change ("slopes") of the increasing and decreasing matched filter output values prior to and subsequent to time $d_t$, using the matched filter output values at delays $d_1$, $d_2$, $d_3$, and $d_4$, respectively. With the four delays $d_1$, $d_2$, $d_3$, and $d_4$ in FIG. 4, for example, delay $d_t$ may be estimated from the intersection of the straight lines joining the matched filter output values of delays $d_1$ and $d_2$ and the straight line joining the matched filter output values of delays $d_3$, and $d_4$. Other forms of estimating delay $d_t$ are possible, such as by fitting the increasing matched filter output values and the decreasing matched filter output values into one or more polynomials of the delay values. Another method for determining time $d_t$ calculates a derivative (i.e., rate of change) of the match filter output value and estimates the time when the derivative reaches zero.

To determine the position of a receiver requires a triangulation process that uses ephemeris information of the satellites. Further, ephemeris information is particularly helpful for coarse acquisition during a cold start. Such ephemeris information may be extracted by decoding the satellite signal received, which is a time-consuming process, or received from a source that is in possession of the information. Typically, accessing such a source requires a data connection over a cellular telephone system or an access to the internet (e.g., WiFi or another broadband medium). For a mobile device, such a data connection may not be available at any given time. In any event, communication over such a data connection power-consuming. The present invention provides a method and a system that does not require the conventional data connection.

Figure 4:
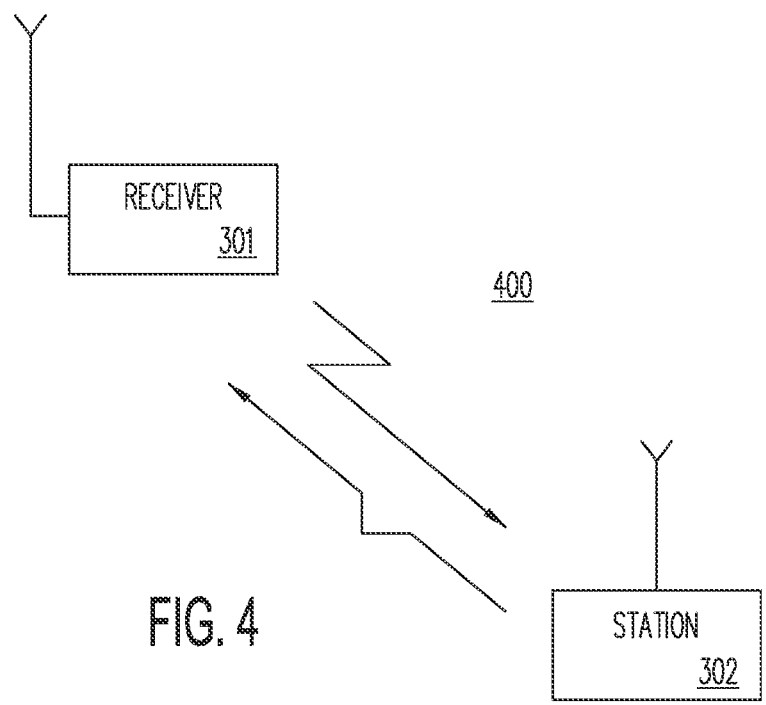
FIG. 4 shows system 400 in which ephemeris data for positioning is supplied without a conventional data connection, in accordance with one embodiment of the present invention.

FIG. 4 shows system 400 in which ephemeris data for positioning is supplied without a conventional data connection, in accordance with one embodiment of the present invention. As shown in FIG. 4, system 400 includes receiver 301 which requests ephemeris information from station 302 over a low-power, long-range wireless data connection. Such a low-power, long-range wireless data connection is available from any of a number of low power wide-area networks ("LPWAN"). One example of such an LPWAN is the LoRa network, which provides a data connection with a data rate of about 50 bytes/second, over a range of about 30 miles. Using a data connection on the LoRa network, receiver 301 may receive ephemeris data from station 302, which may be 30 miles away. As the full ephemeris information is about 100 Kbytes, and as the data rate on the LPWAN is relatively low (e.g., 50 bytes per second), the present invention provides, in a compressed data format to receiver 301, only that portion of the ephemeris data that is essential to perform the signal processing task at hand. In one embodiment, as the range of the LoRa communication is less than 100 miles, station 302 provides only the ephemeris data that is valid a short time in the immediate future, and only for satellites that are above its horizon ("visible") or just below its horizon ("near visible").

According to one embodiment of the present invention, the ephemeris data provided from station 302 includes the expected doppler and the expected elevation of each visible or near-visible satellite visible in the vicinity of station 302 within a predetermined short time period (e.g., 2 hours). FIG. 5*a* is an exemplary estimated variation in doppler values over a next period of 120 minutes for a given satellite visible or near-visible from station 302. To provide this estimated variation in doppler values, station 302 fits the estimated variation in doppler frequency to a third or fourth order polynomial and extracts the corresponding coefficients. The algorithm for the curve-fitting gives greater weights (i.e., minimizes the error) to the larger doppler variation values. In one embodiment, station 302 sends, for each visible or near-visible satellite, an identifier for the satellite, a current delay estimate, a current doppler estimate and the coefficients of the fitted polynomial for the doppler frequency variation. These values allow receiver 301 to reconstruct the doppler variation polynomial obtained from the curve-fitting process described above.

FIG. 5*b* is an exemplary estimated variation in elevation over a period of 120 minutes for a given satellite visible or near-visible from station 30. To provide this estimated variation in elevation values, as in the doppler variation of FIG. 5 *a*, station 302 fits the estimated variation in elevation to a third or fourth order polynomial and extracts the corresponding coefficients. Unlike the case of doppler frequency, the algorithm for the curve-fitting in elevation gives greater weight (i.e., minimizes the error) to the lesser elevation values (e.g., −5° to 5°, or just above or below the horizon). In one embodiment, station 302 sends, for each visible or near-visible satellite, a current estimate for the elevation and the coefficients of the fitted polynomial for the variation in elevation. These values enable receiver 301 to reconstruct the elevation variation polynomial.

The number of bits that are used to represent each of the coefficients in a polynomial is minimized when the error in the fitted polynomial is allowed within certain predetermined error bars. In one implementation, for example, the error bar for the doppler frequency is ±100 Hz and the error bar for elevation is about ±2 degrees when the elevation is at about 15 degrees.

By sending only the ephemeris data for the visible or near-visible satellites and in the compressed data format, the essential ephemeris information may be sent to receiver 301 in the vicinity of station 302 using only 100 bytes or so. Even with the low data rate in a LoRa communication network, the ephemeris information can be provided to the requesting receiver in a few seconds. Therefore, the present invention allows a receiver, using the compressed ephemeris data transmitted over a LPWAN, to achieve a rapid coarse acquisition.

Upon receiving the compressed ephemeris, a receiver performs acquisition and tracking on visible satellites to calculate a pseudo-range from each satellite. The pseudo-ranges may be sent back to station 302 (or a AGPS server), where the position and time of the receiver may be refined using the full ephemeris.

In the acquisition step, the receiver searches coarse delay and doppler value ranges in the delay-doppler space. The compressed ephemeris of the present invention helps to reduce both the number of satellites and the doppler ranges that need to be searched during the acquisition process. The acquisition step also reduces the search space for the tracking step. In one embodiment, the search range during tracking is about 0.5 micro seconds in delay and about 100 Hz for doppler. Counter 119 accurately controls the interval between acquisition and tracking, and the intervals between successive tracking steps. The error in each interval is controlled to be less than the delay search range in the tracking step (e.g., in one embodiment, about ½ chip or 0.5 micro seconds). According to one embodiment of the present invention, after an acquisition or a tracking step, the next delay value $t_{nd}$ (i.e., the center of the next search range for the delay value) may be predicted from the current measured delay value $t_{cd}$ using:

$$t_{nd} = \frac{\Delta f}{f} \times \tau + t_{cd}$$

where $\Delta f$ is the current measured doppler value, f is the frequency of the signal from the satellite being tracked, and $\tau$ is the tracking interval.

After delay $t_d$ is measured for each satellite, the position of the receiver can be determined using AGPS methods. In one embodiment, the transmit times of at the edge of the 1-ms boundaries are not measured and delays from 5 or more satellites are used to calculate the position and time of the receiver. One method for such a method may be found discussed in "A-GPS: Assisted GPS, GNSS, and SBAS" ISBN-10: 1596933747.

In one embodiment, the sampling frequencies of RF frontend 111 are different for the acquisition and the tracking steps. In the acquisition step, RF frontend 111 uses a lower sampling frequency (e.g., 4 MHz) to reduce the amount of calculation for the acquisition step. In the tracking step, however, the RF frontend 111 uses a higher sampling frequency, which improves the accuracy in the delay estimate and therefore the accuracy of the pseudo-range estimate.

Figure 6B:
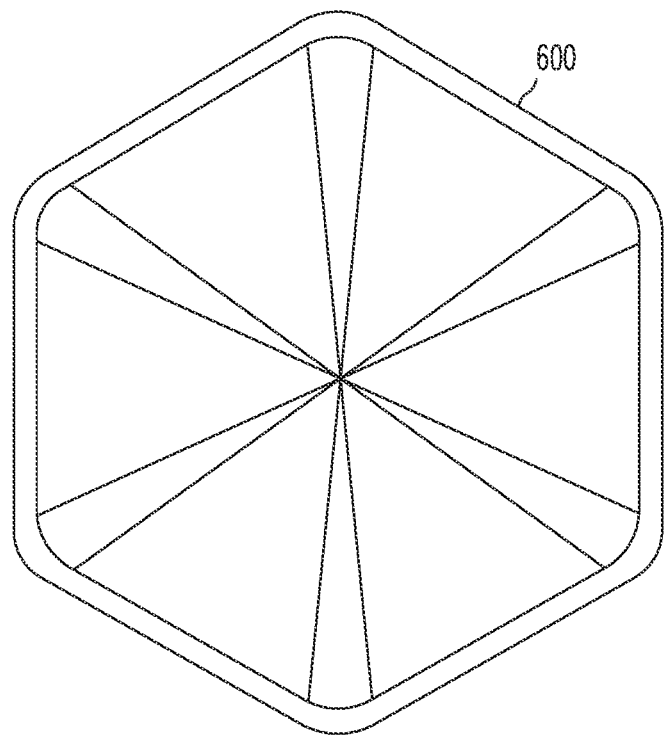
FIGS. 6a, 6b and 6c shows the top, bottom and side views of hexagonal housing 600 suitable for housing a positioning device, in accordance with one embodiment of the present invention.
Figure 6A:
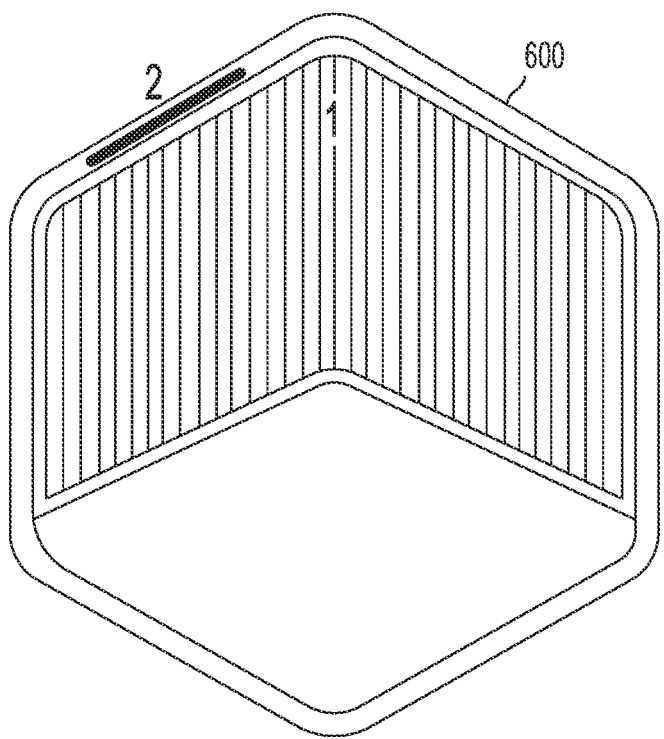
Figure 6C:
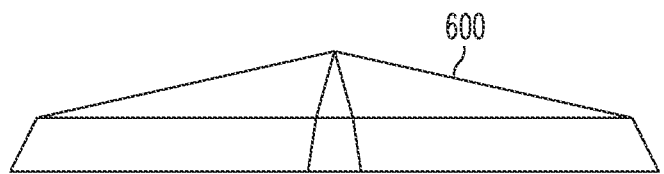

According to one embodiment of the present invention, using signal detection methods disclosed herein and in the '404 patent, the present invention provides a positioning device that is very low-power. In fact, such a positioning device is so low-power as can be solar-powered. FIGS. 6*a*, 6*b* and 6*c* shows the top, bottom and side views of hexagonal housing 600 suitable for housing such a positioning device, in accordance with one embodiment of the present invention. Housing 600 of FIGS. 6*a*, 6*b* and 6*c* may be 2-inch long along each hexagonal side and about ½ inch thick. As shown in FIG. 6*a*, solar panel 1 may be mounted on the top cover of housing 600. Communication antenna 2, for communication over a LPWAN (e.g., a LoRa network), may be mounted along one side of hexagonal housing 600.

Figure 6D:
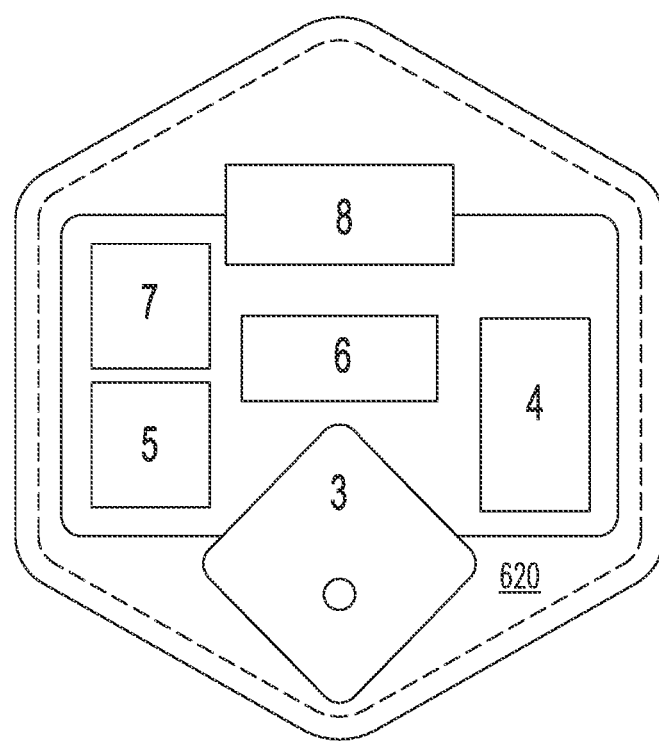
FIG. 6d shows, provided within housing 600, printed circuit board 620, on which various circuit components may be mounted, in accordance with one embodiment of the present invention.

FIG. 6*d* shows, provided within housing 600, printed circuit board 620, on which various circuit components may be mounted, in accordance with one embodiment of the present invention. Printed circuit board 620 includes (i) GPS antenna 3, for receiving the satellite signals for signal detection, (ii) communication module 4, coupled to communication antenna 2, for transmitting and receiving data signals over the LPWAN (e.g., a LoRa network), (iii) positioning module 5, which includes the circuits shown in FIG. 1, (iv) rechargeable battery 8 (e.g., a battery based on lithium chemistry), (v) power module 7, coupled to both solar panel 1 and battery 8, configured to regulate power regulation operations, e.g., charging battery 8, and (vi) control module 8, which generally controls the circuits mounted on printed circuit board 620.

The above detailed description is provided to illustrate specific embodiments of the present invention and is not intended to be limiting. Numerous modifications and variations within the scope of the present invention are possible. The present invention is set forth in the accompanying claims.

I claim:

1. An assisted satellite positioning system based on detecting signals from a number of satellites, comprising:
 a mobile receiver; and
 a base station communicating with the receiver over a low-power wireless communication network, the base station providing ephemeris data of a selected number of the satellites, but not all, using a compressed data format, wherein the ephemeris data in the compressed data format comprises both doppler frequency variations and elevation variations of the selected satellites over a predetermined time interval.

2. The assisted satellite positioning system of claim 1, wherein the doppler frequency variations and the elevation variations are represented in the compressed format by coefficients of a polynomial function of time.

3. The assisted satellite positioning system of claim 2, wherein the polynomial function is weighted to have lesser relative errors in larger doppler frequencies than lesser doppler frequencies.

4. The assisted satellite positioning system of claim 2, wherein the polynomial function is weighted to have lesser relative errors in lesser elevations than larger elevations.

5. The assisted satellite positioning system of claim 1, wherein the low-power wireless communication network comprises a LoRa network.

6. The assisted satellite positioning system of claim 1, wherein the low-power wireless communication network has a range of at least 10 miles.

* * * * *